May 21, 1946.   L. R. HEIM   2,400,506
ROD END BEARING AND METHOD OF MAKING SAME
Filed Nov. 5, 1942
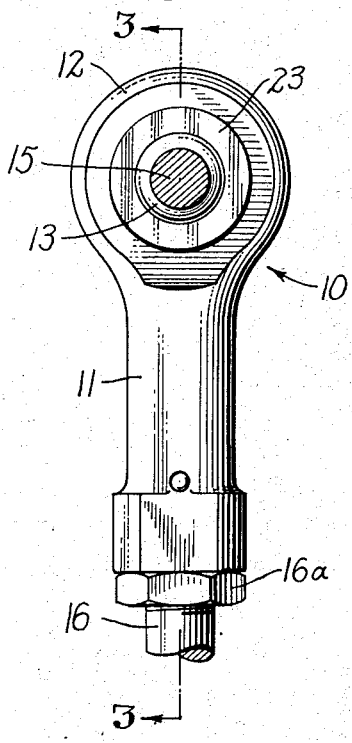
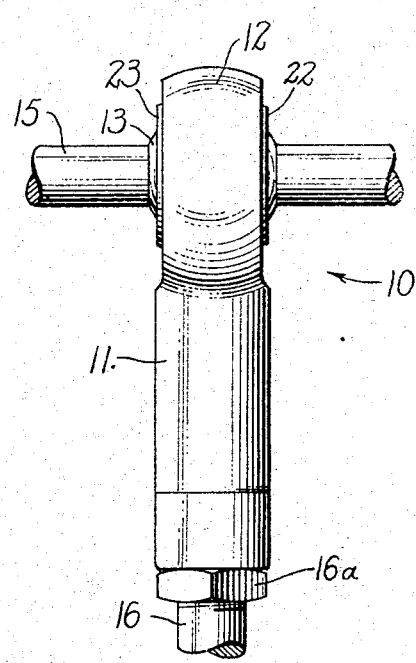
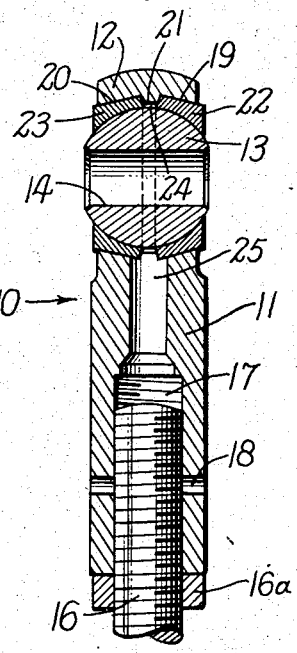
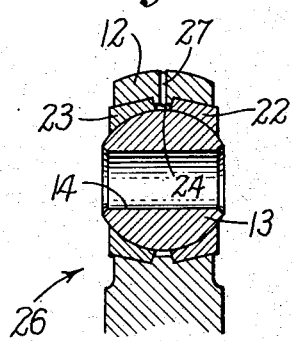
INVENTOR.
Lewis R. Heim
BY
Blair, Curtis & Hayward
ATTORNEYS Patented May 21, 1946

2,400,506

UNITED STATES PATENT OFFICE 2,400,506

ROD END BEARING AND METHOD OF MAKING THE SAME

Lewis R. Heim, Fairfield, Conn., assignor to The Heim Company, Fairfield, Conn., a corporation of Connecticut Application November 5, 1942, Serial No. 464,612

9 Claims. (Cl. 308—72)

This invention relates to a bearing, more specifically of the rod end type, and method of making the same and is a continuation in part with respect to my co-pending application, Serial No. 460,134, filed September 29, 1942, now Patent No. 2,366,668.

One of the objects of this invention is to provide a rod end bearing of high rigidity and precision, and which is capable of extended, rigorous use under diverse atmospheric conditions without the necessity of frequent lubrication. Another object is to provide a method of making a rod end bearing by which the bearing may be assembled with great rapidity and high precision. Other objects will be in part apparent and in part pointed out hereinafter.

The invention accordingly consists in the features of construction, combinations of elements, arrangements of parts, and in the several steps and relation and order of each of the same to one or more of the others, all as will be illustratively described herein, and the scope of the application of which will be indicated in the following claims.

In the drawing, wherein I have shown two embodiments of my invention,

Figure 1 is a side view of my bearing attached to a rod or the like;

Figure 2 is a front view of the bearing;

Figure 3 is a section taken along the line 3—3 of Figure 1; and,

Figure 4 is a sectional view similar to Figure 3, but showing a modified form of my bearing.

Similar reference characters refer to similar parts throughout the views of the drawing.

With reference to Figure 1 of the drawing, my bearing comprises in general a body or eye member generally indicated at 10, formed by a shank 11 and a head 12. Rotatably retained in head 12 is a ball 13 (Figure 3) having a hole 14 extending therethrough, through which may extend a rod 15 (Figure 2) which is to be attached to a rod 16 threaded into shank 11 for limited universal movement therebetween.

As shown in Figure 3, shank 11 is drilled and threaded as at 17 so that the rod 16 may readily be assembled to the bearing. Preferably the end of rod 16 is locked within the threaded shank 11 by a lock nut 16a, a peep hole 18 being provided in the shank to enable the assembler to observe the extent of penetration of the rod.

Head 12 of body member 10, as shown in Figure 3, is provided with a pair of tapered bores 19 and 20 which are separated by a locating and stiffening abutment or rib 21 or the like, against the opposite sides of which a pair of bushings 22 and 23 engage when the bearing is assembled, as will be described below. Rib 21 accordingly defines a hole within head 12, and the diameter of this hole exceeds the diameter of ball 13 so as to define with the ball, when the ball is in the head, an annular slot or groove 24 which acts as a channel for the retention of a suitable lubricant.

Shank 11 is also provided with a lubricant reservoir 25 which communicates with the threaded hole in the shank, and which also communicates with the lower portion of groove 24. If desired, reservoir 25 may be filled with a suitable lubricant when the bearing is attached to the rod 16, and this lubricant may advantageously be graphite, or, if desired, reservoir 25 may be loaded with a wick (not shown) impregnated with a suitable lubricant such as machine oil. In either event, the lubricant fills groove 21 and accordingly ensures proper lubrication of ball 13 as it moves within bushings 22 and 23. Thus rib 21 not only provides with ball 13 a suitable channel or space for the retention of a lubricant, but also materially stiffens head 12 of the bearing, thus making this part of the bearing extremely rigid.

My bearing may be assembled in the same manner as described in my above-noted copending application, wherein I have shown a suitable die-set for this purpose. Thus, the two bushings 22 and 23 which are initially provided with a cylindrical outer periphery and a spherical inner surface, are forced respectively into tapered bores 19 and 20, and as they are pressed or driven into these bores, the malleable metal thereof expands so that the bushings conform not only to the shape of the bores but also to the spherical surface of the ball, thus securely locking the ball within head 12. This action as set forth in my above noted copending application gives an extremely tight fit between the bushings and the inner surface of the member into which they are inserted and yet permits rotation and a limited universal or swinging movement of the inner member within their inner surfaces. Also, the inner edges of bushings 22 and 23 engage the opposite sides of rib 21 during the assembly operation, thus accurately locating the bushings and preventing either from entering too far into the head. Thus the bushings and accordingly ball 13 may be rapidly located in the head with a high degree of precision, and obviating the necessity of further machining operations to complete the bearing.

In Figure 4 I have shown a bearing generally indicated at 26 which differs from the bearing shown in Figure 3, in that bearing 26 is not provided with the oil reservoir 25 of the bearing in Figure 3. Bearing 26 (Figure 4) is, however, provided with a hole 27 which extends through the top of head 12 so as to communicate with lubricant groove 24. When this type of oil lubricant hole is provided, I prefer to pack groove 24 with graphite, which may be renewed as necessary by the insertion of additional graphite through hole 27. Of course other lubricants may be used also.

Bearing 26 is assembled as described above with respect to the bearing shown in Figure 3.

Thus, I have provided an improved rod end bearing and method of making the same which attains the several objects hereinabove set forth in a thoroughly practical and efficient manner.

As many possible embodiments may be made of the mechanical features of the above invention, and as the art herein described might be varied in various parts, all without departing from the scope of the invention, it is to be understood that all matter hereinbefore set forth or shown in the accompanying drawing is to be interpreted as illustrative and not in a limiting sense.

I claim:

1. The herein described art of making a bearing construction, which consists in forming in an outer member a hole of a diameter gradually increasing in a direction away from its end to a point where it is sharply reduced in diameter, forming a bearing member having a surface of revolution of gradually increasing diameter in a direction transverse to its axis, inserting in said hole said last mentioned member into a position with said surface of inwardly increasing diameter substantially opposite the area of increasing diameter of the hole, and forcing between said parts an annular bushing to expand it over said inner member as it passes into a position abutting against said portion of said outer member of reduced internal diameter and fills the space between said surfaces of said members and thereby revolubly locks said inner member against movement toward said end.

2. The herein described art of making a bearing construction, which consists in forming an outer member with a hole therethrough the diameter of which increases in a direction from each end toward an inward annular abutment formed on said outer member, forming a member having surfaces of revolution of transverse diameter gradually increasing in a direction away from each end thereof, inserting in said hole said last member into a position in which said surfaces are substantially opposite the surfaces of increasing internal diameter of the outer member, and forcing into the space between said members from each end a pair of annular bushings to expand them over said inner member and force them against opposite sides of said abutment to fit the opposing surfaces of said members and revolubly lock said inner bearing member against movement axially of said hole.

3. The herein described art of making a bearing construction, which consists in forming in an outer member a hole extending therethrough of increasing diameter from each end and of lessened diameter adjacent the center to form an inwardly directed annular abutment, forming a member having a substantially spherical bearing surface, inserting within said hole said last member with said spherical surface opposite said surfaces of increasing diameter, and forcing between said members from each end an annular malleable bushing into a position in which each of them is expanded over said spherical surface and is forced against said abutment and fits the opposing surfaces of said members permitting said inner member to rotate therein and holding it against endwise movement.

4. The herein described art of making a bearing construction, which consists in forming in an outer member a hole of a diameter increasing in a direction away from each end up to a substantially central portion forming an inwardly directed annular abutment, forming a bearing member having a substantially spherical bearing surface, inserting said last member with its maximum diameter less than the inner diameter of said abutment and substantially opposite the same, and forcing into said hole from each end a pair of annular bushings which are thereby expanded over said inner member and against abutment into a position in which they respectively engage opposite sides of said abutment and hold said inner member in spaced relationship to said abutment and respectively fill the spaces between the opposing surfaces of said inner and outer members thereby locking said inner member against outward movement toward either end of said hole and permitting rotary and swinging movement thereof.

5. In bearing construction, in combination, an inner member having a gradually increasing diameter in a direction away from its end, an outer member having a hole therethrough which gradually increases in internal diameter up to an inwardly directed annular abutment spaced from the end of the hole, and a bushing of substantially non-yielding material fitted directly between said opposed inclined surfaces of said members and resting against said abutment to wedge between said members and lock the inner member against outward movement relative to the outer member in an axial direction while permitting free rotation thereof.

6. In bearing construction, in combination, an outer member having a hole therethrough the diameter of which gradually increases in an inward direction from each end to a central inwardly directed abutment, an inner member having a substantially spherical bearing surface within said hole and having its portion of maximum diameter substantially opposite said abutment, and a pair of bushings of substantially non-yielding material fitting closely the opposing surfaces of said members and resting at their ends against said abutment each of which is adapted to wedge between said members and prevent axial movement of said inner member with respect to said outer member in either axial direction while permitting free rotation therein.

7. In bearing construction, in combination, an outer member having a hole therethrough the diameter of which gradually increases in an inward direction from each end to a central inwardly directed abutment, an inner member having a substantially spherical bearing surface within said hole and having its portion of maximum diameter substantially opposite said abutment, and a pair of bushings of substantially non-yielding material fitting closely the opposing surfaces of said members while permitting free rotation and swinging of said inner member therein and resting at their ends against said abutment each of which is adapted to wedge between said members and prevent axial movement of said inner member with respect to said outer member in either axial direction, said inner member being of less diameter than the inner surface of said abutment and thereby providing an annular oil space between said bushings extending about said inner member.

8. The herein described art of making a bearing construction, which consists in forming in an outer member a hole of a diameter sharply decreased intermediate its ends to form an inward abutment and outwardly recessed between said abutment and the end of the hole toward which the abutment faces, forming a bearing member having a spherical bearing surface, inserting within said hole said last member, and forcing into the space between said members an annular malleable bushing to expand the same over said spherical surface into a position engaging said abutment and filling the space between the inner surface of the outer member and the opposed spherical surface of said inner member whereby said inner member is locked against movement in the direction of said end of said hole and is permitted to rotate and swing within said bushing.

9. The herein described art of making a bearing construction, which consists in forming an outer member whose bore is outwardly recessed between its ends and inwardly directed to provide an abutment between said recessed portions, forming a bearing member having bearing surfaces of revolution of gradually increasing transverse diameter in directions away from the axial ends thereof, inserting in said bore said bearing member having portions of gradually increasing diameter at each side of said abutment, and forcing over said inner member from each end an annular bushing to expand the same by endwise pressure and the increasing diameter of said inner member into interlocking relation with said recessed portions of said bore and abutting relation with said abutment and thereby locking together said several members and permitting rotation of said inner member within said bushings.

LEWIS R. HEIM.